United States Patent
Yew

[11] B 3,987,769
[45] Oct. 26, 1976

[54] JET IGNITION ENGINE WITH VALVE-CARRIED IGNITION CHAMBER

[75] Inventor: Ming-Chih Yew, Rochester, Mich.

[73] Assignee: General Motors Corporation, Detroit, Mich.

[22] Filed: Mar. 31, 1975

[21] Appl. No.: 563,780

[44] Published under the second Trial Voluntary Protest Program on February 3, 1976 as document No. B 563,780.

[52] U.S. Cl. ............... 123/75 B; 123/32 SP; 123/188 VA; 123/191 S; 123/DIG. 4
[51] Int. Cl.² ........................... F02B 75/02
[58] Field of Search ... 123/188 S, 188 VA, 188 AF, 123/188 SC, 90.22, 90.23, 79 R, 79 C, 32 C, 32 D, 32 K, 32 SP, 32 ST, 127, 75 B, 191 S, DIG. 4, 191 SP

[56] References Cited
UNITED STATES PATENTS

| 942,587 | 12/1909 | Pearson | 123/108 VA |
|---|---|---|---|
| 1,232,108 | 7/1917 | Sims | 123/188 AF |
| 2,799,257 | 7/1957 | Stampfig et al. | 123/32 SP |
| 3,382,850 | 5/1968 | Baudry et al. | 123/75 B |
| 3,881,459 | 5/1975 | Gaetcke | 123/75 B |

Primary Examiner—Wendell E. Burns
Assistant Examiner—David D. Reynolds
Attorney, Agent, or Firm—Robert J. Outland

[57] ABSTRACT

A jet ignition internal combustion engine of the type provided with separate induction passages for lean and rich air-fuel mixtures wherein the main inlet valve mounts a cup like member forming an auxiliary ignition chamber within the main combustion chamber. The rich mixture is supplied to the auxiliary chamber through the hollow stem of the main inlet valve, flow being controlled by a small auxiliary valve within the main valve and actuated by the same valve gear. Openings in the wall of the valve-carried ignition chamber connect with spark ignition means and with the main combustion chamber to provide for spark ignition of the rich ignition chamber mixture and resultant jet ignition of the lean mixture in the main combustion chamber.

8 Claims, 6 Drawing Figures

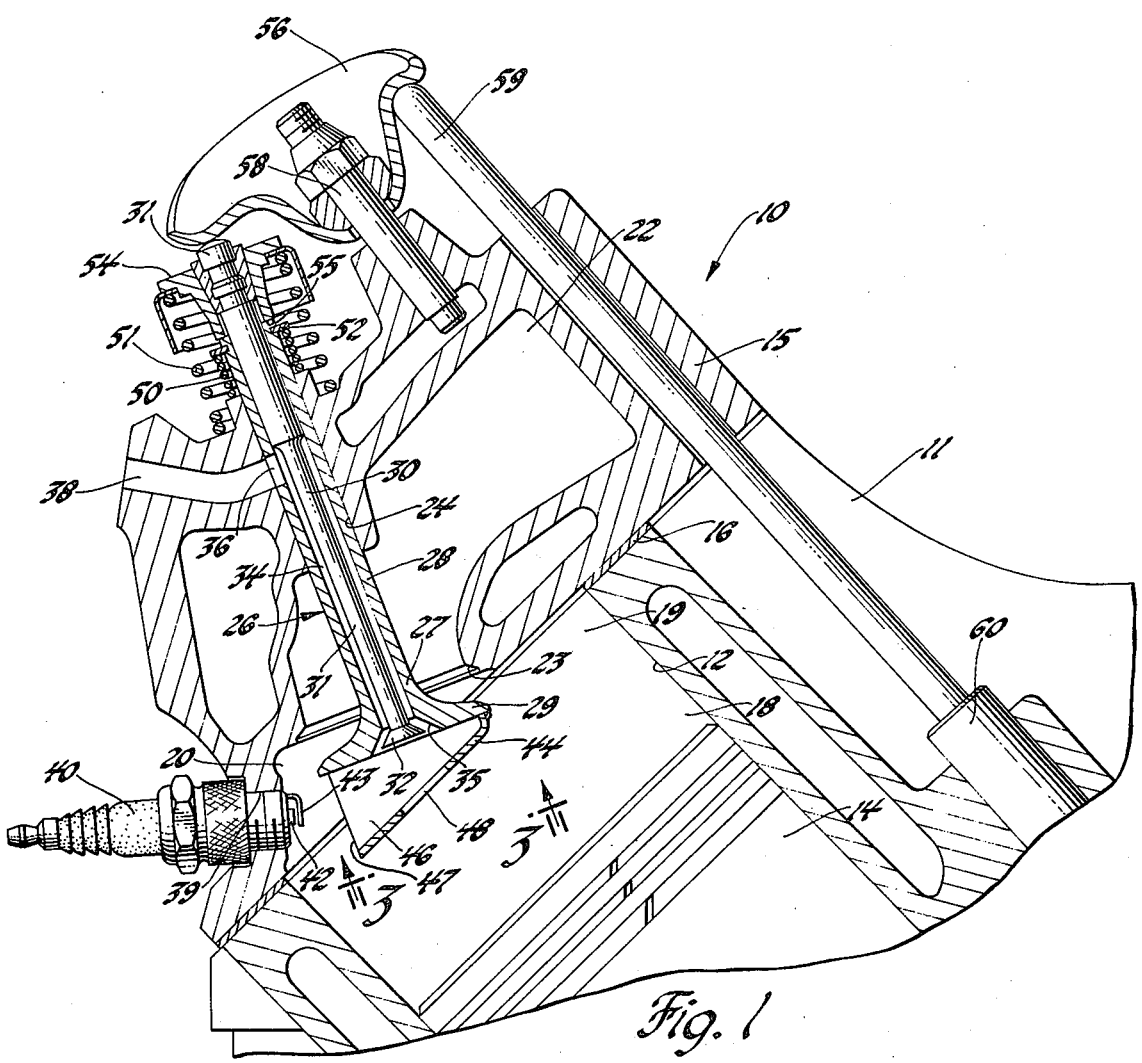
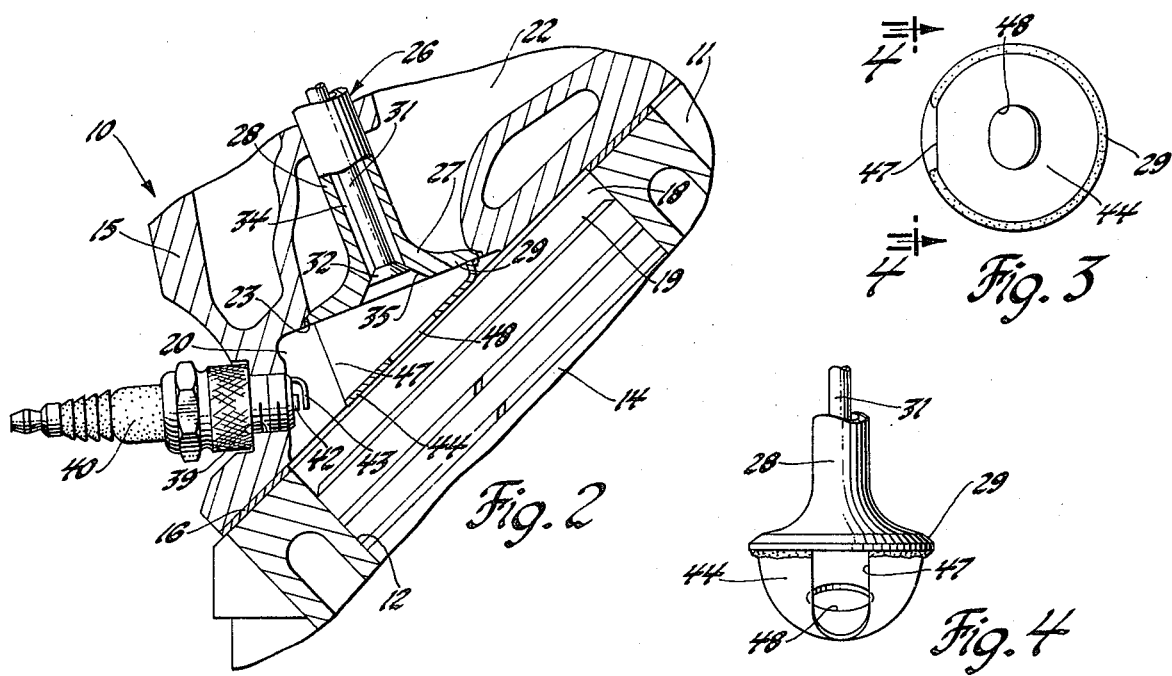

JET IGNITION ENGINE WITH VALVE-CARRIED IGNITION CHAMBER

FIELD OF THE INVENTION

This invention relates to internal combustion engines and more particularly to engines of the jet ignition type wherein a lean mixture in a main combustion chamber is ignited by a jet of flame formed by the combustion of an easily ignited rich mixture in a small auxiliary combustion chamber connected with the main chamber by a restricted orifice.

BACKGROUND OF THE INVENTION

It is known in the art to provide for jet ignition of lean mixtures in engine combustion chambers by ignition of rich mixtures in adjacent small ignition chambers connected with the main chambers by restricted orifices. It is further known to supply the main combustion and auxiliary ignition chambers with separately carbureted, or otherwise formed, lean and rich mixtures, respectively, through separate induction passages having their own inlet valves. In general, the arrangement of the dual inlet valves for the main and auxiliary chambers and the mechanism for actuating these valves adds complexity to the design of internal combustion engines, as compared to spark ignition engines that are not provided with separate ignition chambers.

SUMMARY OF THE INVENTION

The present invention provides an arrangement for a jet ignition engine having separately supplied auxiliary ignition chambers within the main combustion chambers wherein the differences in construction from conventional spark ignition engines are significantly reduced. The reduced complexity is brought about through the provision of concentric main and auxiliary inlet valves actuated by the same valve actuating mechanism and auxiliary ignition chambers formed on the ends of the main inlet valves where they may be supplied with rich air-fuel mixtures through the auxiliary inlet valves, mounted within the main inlet valve. Openings connect the auxiliary chambers with the spark gaps of adjacent spark plugs and with the main chamber to provide for ignition of the rich mixtures in the auxiliary chambers and subsequent jet ignition of the lean mixtures in the main chambers.

These and other features and advantages of the invention will be more fully understood from the following description of certain illustrative embodiments, taken together with the accompanying drawings.

BRIEF DESCRIPTION OF THE DRAWINGS

In the drawings:

FIG. 1 is a fragmentary transverse cross-sectional view of an illustrative embodiment of jet ignition engine formed according to the invention and showing the inlet valves in their open positions;

FIG. 2 is a fragmentary view similar to FIG. 1, but showing the inlet valves in their closed positions;

FIG. 3 is a view from the plane indicated by the line 3—3 of FIG. 1, showing the bottom of the auxiliary chamber formed on the main inlet valve.

FIG. 4 is a side view of the inlet valve and auxiliary chamber construction as viewed from the plane indicated by the line 4—4 of FIG. 3.

DESCRIPTION OF THE ILLUSTRATIVE EMBODIMENTS

Figure 5:
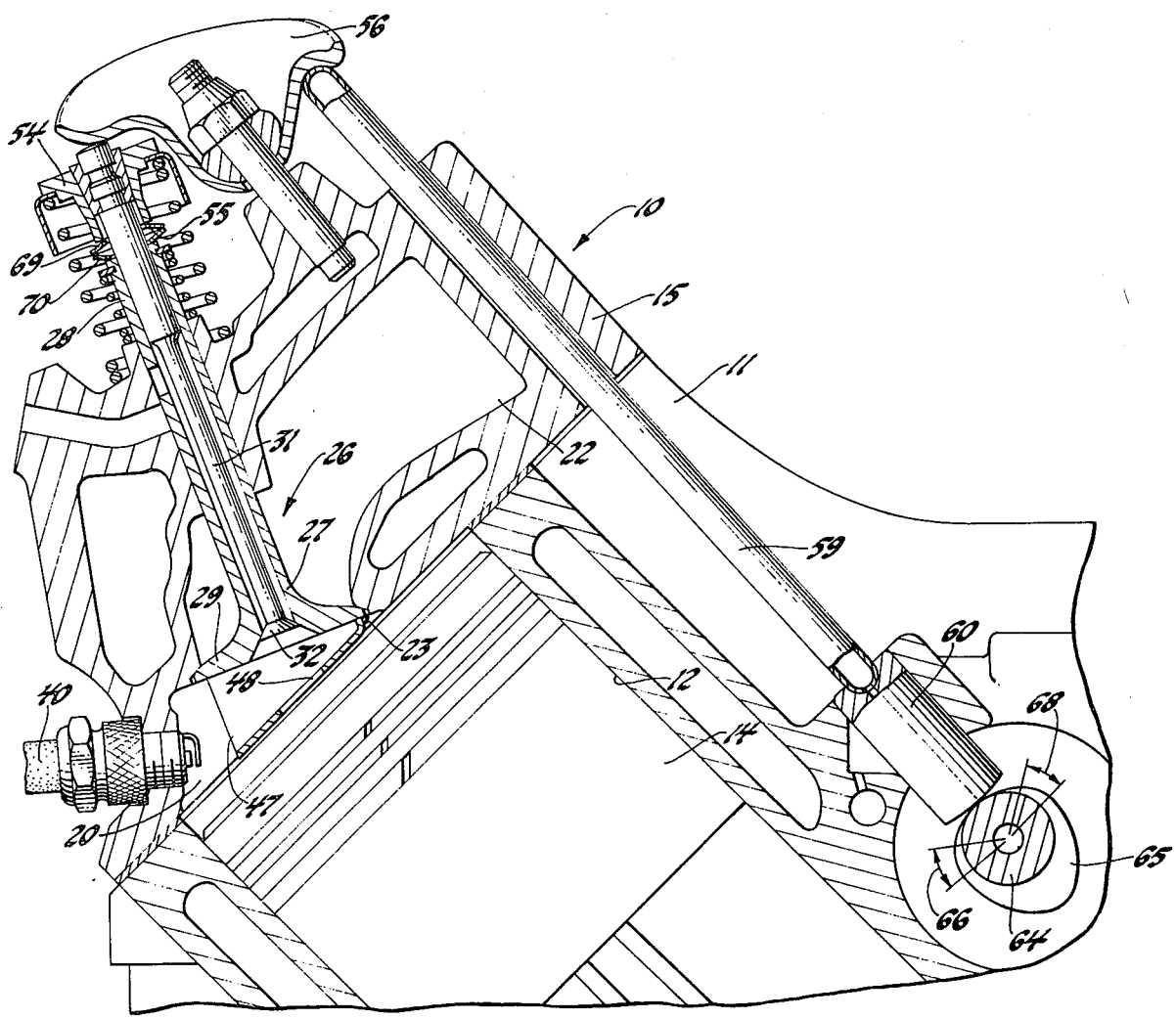
FIG. 5 is a fragmentary transverse cross-sectional view similar to FIG. 2, but showing an alternative embodiment of engine in accordance with the invention.

Referring first to FIGS. 1–4 of the drawings, there is shown a jet ignition internal combustion engine generally indicated by numeral 10. Engine 10 includes a cylinder block 11 of the well-known "V" type including a plurality of cylinders 12 formed in a pair of angularly disposed banks, only one of which is shown. Each bank includes a plurality of cylinders 12, in each of which is reciprocably mounted a piston 14 that is connected in conventional fashion to the engine crankshaft, not shown.

A cylinder head 15 is mounted on each of the cylinder banks, closing the ends of the cylinders 12, the joint being sealed by a gasket 16. At the end of each cylinder, the cylinder head, cylinder walls and piston together define a variable volume combustion chamber 18 which, in the illustrative embodiment, is made up of a disk shaped main portion 19 formed between the cylinder head and piston at its top dead center position, as shown in FIG. 2, and a smaller wedge shaped portion 20 formed by a recess in the cylinder head wall.

The cylinder head 15 is provided with an inlet port 22 and an exhaust port, not shown, communicating with adjacent parts of the wedge shaped portion 20 of each combustion chamber. Inlet port 22 extends from a valve seat 23 located at its juncture with the combustion chamber, to the exterior of the head where it connects with external means for supplying a lean air-fuel mixture to the combustion chamber, such as a manifold and carburetor (not shown).

At each of the port locations, the cylinder head is also provided with valve guides 24 for receiving valves to control the respective ports.

In each of the inlet valve guides, there is reciprocably mounted a main and auxiliary inlet valve and auxiliary ignition chamber assembly generally indicated by numeral 26. Assembly 26 comprises a main inlet valve 27 having a hollow stem 28 and a mushroom type head 29 adapted to engage the valve seat 23 to close its respective inlet port 22. An auxiliary inlet valve 30 is reciprocably carried within the hollow stem 28 of the main inlet valve and includes a reduced diameter stem portion 31, terminating in an enlarged head 32. The reduced diameter portion 31 of the stem provides clearance from the interior of the hollow main inlet valve stem, which defines an auxiliary induction passage 34 within the main valve. This passage is closed by the engagement of the head 32 of the auxiliary valve with a valve seat 35 provided in the head 29 of the main valve at the end of the passage 34. Passage 34 is in turn supplied through an opening 36 provided in the wall of the hollow valve stem 28 which, when the valves are open, registers with an auxiliary intake port 38 formed in the cylinder head and connecting externally with a source of rich air-fuel mixture, such as the carburetor, not shown.

At the thicker end of the wedge shaped portion 20 of the combustion chamber and adjacent its respective main inlet valve 27, there is provided a spark plug opening 39 mounting a spark plug 40 having electrodes 42, 43 which form a spark gap within the combustion chamber wedge shaped portion 20. The spark gap is located as close to the inlet valve as possible for reasons which will subsequently be made clear.

On the lower face of the main inlet valve 27 there is secured, as by welding, a thin walled cup shaped member 44 formed, for example, of stainless steel or other suitable material capable of withstanding high temperatures. Member 44 cooperates with the bottom of the main valve head 29 to define a small auxiliary ignition chamber 46 extending into the main combustion chamber, but remaining generally within the wedge shaped portion 20 when the main inlet valve 27 is closed. An elongated opening 47 is provided in the side of member 44 opposite the location of the spark gap formed by electrodes 42, 43, so as to provide communication between the interior of the auxiliary chamber 46 and the spark gap in the wedge shaped portion 20 of the main chamber. A second opening 48 in the bottom of member 44 forms a restricted orifice that communicates the main volume of the auxiliary chamber 44 with the remainder of the main combustion chamber 18.

The main and auxiliary inlet valves are biased toward their seated positions by separate valve springs 50 and 51. Spring 50 acts between the cylinder head and a spring clip 52 mounted near the end of the main valve stem 28, while spring 51 acts between the head and a spring cap 54 which is conventionally retained on the end of the auxiliary inlet valve stem 31. At its lower end, spring cap 54 has an annular surface 55 which engages the end of the main valve stem 28 upon downward movement of the auxiliary valve in an opening direction, so as to provide for opening of the main valve also.

Actuation of the main and auxiliary valves is accomplished by a conventional mechanism comprising a rocker arm 56 mounted on a ball stud 58 and actuated by a push rod 59 and hydraulic lash adjustor 60 through engagement with a conventional camshaft, not shown.

The operation of the engine illustrated in FIGS. 1-4 is as follows.

Rotation of the crankshaft causes the pistons to reciprocate in the cylinders and the valve actuating mechanism to move in conventional relation therewith to perform the known four-stroke engine operating cycle comprising intake, compression, expansion and exhaust phases. As the piston reaches its top dead center position to begin the intake stroke, the actuating mechanism for the associated inlet valves is operated so that the rocker arm 56 moves downwardly the stem 31 of the auxiliary inlet valve, moving the valve in an opening direction. As the valve moves downwardly, the auxiliary valve opens until the spring cap 54 engages the end of the main valve stem 28. Further downward movement opens this valve, also, which brings the opening 36 into registration with the auxiliary inlet port 38.

Contemporaneous downward motion of the piston on the intake stroke draws a small amount of rich air-fuel mixture through the intake port 38, opening 36 and annular passage 34 into the auxiliary ignition chamber 46. At the same time, a lean air-fuel mixture is being inducted through the main intake port 22, past the valve seat 23, and into the main combustion chamber 18.

At the end of the intake stroke, the valves are closed, moving the valve supported auxiliary chamber 46 within the wedge shaped portion 20 of the combustion chamber, while the piston moves upwardly on the compression stroke. Upon nearing the top dead center position of the piston, the spark plug is fired, igniting the rich mixture in and adjacent to the auxiliary ignition chamber, which is in close proximity to the spark gap through the opening 47. Combustion of the rich mixture causes a flame jet of burned and burning products to be forced through the orifice opening 40 into the main chamber, igniting the lean mixture therein in known fashion. The resulting combustion forces the piston downwardly on the expansion stroke; and the burned gases are subsequently removed from the cylinder by upward movement of the piston on the exhaust stroke, while the exhaust valve, not shown, is in the open position.

FIG. 5 of the drawing shows an engine embodiment which is similar to the embodiment of FIGS. 1-4, differing therefrom in that it includes certain modifications for reducing opening and closing shocks on the main inlet valve. One of these modifications includes provision on the camshaft 64 of an inlet valve actuating cam 65, having a specially shaped contour that includes ramp like transition areas 66, 68 on the cam surface on either side of the lowest lift position of the cam.

These transition areas consist of cam portions giving a relatively low rate of valve movement with respect to cam rotation and are arranged to coincide with the period during which the spring cap 54 effectively engages the valve stem 28 of the main valve upon opening movement of the inlet valve assembly and the period during which the main valve 27 engages the valve seat 23 during closing movement of the inlet valve assembly. The transition areas provide a slowing down of the movement of the valve actuating mechanism in these areas to reduce the shock load caused by the opening engagement of the main inlet valve by the spring cap 54 and the seating of the main valve on its closing motion. Thus, the motion of cam linkage provides a relatively rapid initial opening movement for the auxiliary inlet valve, a slow motion for engaging the main valve, and a following rapid opening movement for opening the main valve, the closing motion being exactly the reverse.

An additional feature of the FIG. 5 arrangement is the provision of dished washer springs 69, 70 between the annular surface 55 of the spring cap 54 and the end of the main inlet valve stem 28 to absorb some of the shock of valve opening. Since the purpose of these springs duplicates in part the function of the transition area on one side of the camshaft, it should be apparent that both features may be utilized together, as shown, or one may, if desired, be dispensed with.

Figure 6:
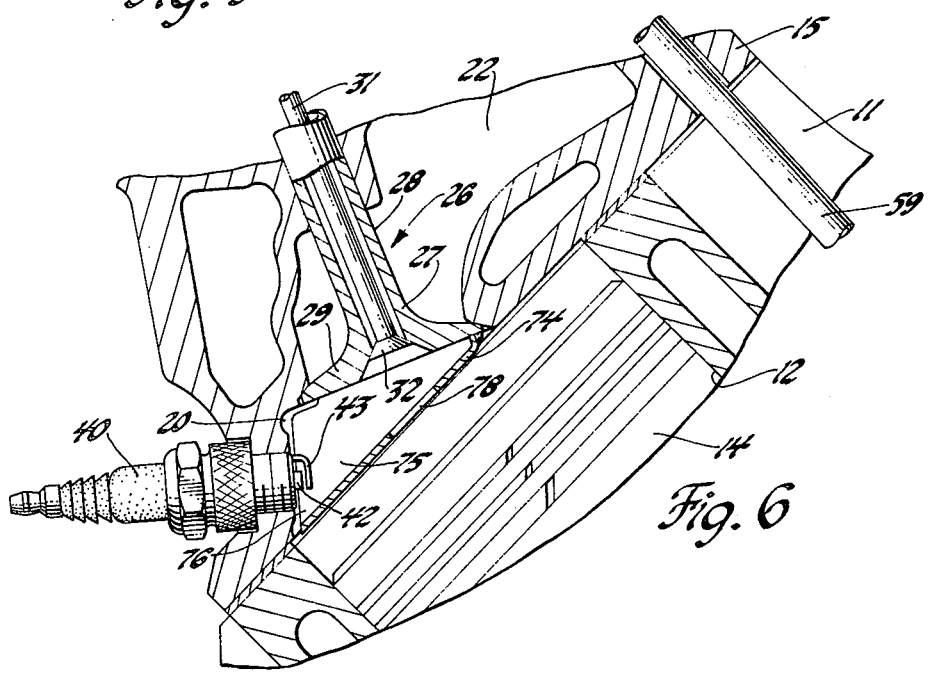
FIG. 6 is a cross-sectional view similar to FIG. 5, but showing yet another embodiment of the invention.

FIG. 6 illustrates another embodiment of engine according to the invention similar to the arrangement of FIGS. 1-4, but differing in that the cup shaped member 74, which is secured to the bottom of the main inlet valve to form the auxiliary ignition chamber 75, differs in configuration from that of the first described embodiment. Member 74 includes an extended portion 76 which approaches the end wall of the wedge shaped portion 20 of the combustion chamber surrounding the electrodes 42, 43 and bringing the spark gap within the auxiliary ignition chamber enclosure. This construction provides for more positive retention of a rich mixture around the spark gap. It also reduces the clearances between the spark gap area and the main chamber so that combustion pressures in the auxiliary chamber are more positively directed through the orifice 78 into the main chamber for ignition of the main charge.

While the invention has been described by reference to certain specific embodiments chosen for purposes of illustration, it should be understood that numerous changes could be made within the scope of the inventive concepts disclosed. Accordingly, it is intended that the invention not be limited, except by the language of the following claims.

What is claimed is:

1. An internal combustion engine comprising
means defining a variable volume main combustion chamber,
a main inlet port to said chamber
a main inlet valve closing said inlet port and operable to permit the entry of fluids to said main combustion chamber through said port,
an auxiliary ignition chamber formed on the end of said main inlet valve and extending into said main combustion chamber, said auxiliary chamber being connected with said main chamber by at least one orifice in a wall thereof,
an auxiliary inlet passage extending through said main inlet valve to said auxiliary chamber,
an auxiliary inlet valve in said main inlet valve and operable to permit the entry of fluids to said auxiliary ignition chamber through said auxiliary inlet passage,
means for cyclically opening and closing said inlet valves and
means for igniting fluids in said ignition chamber for combustion therein, with resulting expansion through said orifice to ignite fluids in said main combustion chamber.

2. An internal combustion engine comprising
means defining a closed-end cylinder,
a piston reciprocably movable in said cylinder and defining therewith a variable volume main combustion chamber at said closed end,
a main inlet port to said main chamber through the closed end of said cylinder,
a main inlet valve closing said inlet port and operable to permit communication of said port with said main chamber, said valve having a head and a stem reciprocably movable in said cylinder defining means, said stem and head having an axial auxiliary inlet passage,
wall means on the head of said main inlet valve and defining therewith an auxiliary ignition chamber within said main combustion chamber and connected therewith by at least one orifice, said auxiliary inlet passage connecting with said auxiliary ignition chamber,
an auxiliary inlet valve reciprocably disposed in said main inlet valve and movable to open or close connection of said auxiliary inlet passage with said auxiliary ignition chamber
means for igniting fluids in said ignition chamber for combustion therein with resulting expansion through said orifice to ignite fluids in said main combustion chamber, and
valve actuating means including spring means biasing said valves in a closing direction and engine driven operating means, operable to cyclically open said valves and admit fluids from said main inlet port to said main combustion chamber and fluids from said auxiliary inlet passage to said auxiliary ignition chamber.

3. The engine of claim 2 wherein said spring means include a first spring acting on said main inlet valve and a second spring acting on said auxiliary inlet valve and said operating means directly actuates said auxiliary inlet valve, said main and auxiliary valves being engagable to connect said operating means with said main valve after opening of said auxiliary valve, such that further movement in an opening direction, opens said main inlet valve.

4. The combination of claim 3 and further including third spring means acting between said main and auxiliary valves, said third spring means being compressed during initial opening movement of said auxiliary valve to soften the impact of engagement of said main and auxiliary valves.

5. The combination of claim 3 wherein said operating means includes a cam follower actuated by a cam, said cam being provided with a variable closing curve including a transition area that slows the rate of valve closing as the main inlet valve reaches its seat, said transition area being positioned between closing cam portions of higher rate for sequentially and respectively quickly closing said main and auxiliary inlet valves.

6. The combination of claim 3 wherein said operating means includes a cam follower actuated by a cam having variable rate opening and closing curves, each including a slow movement transition area between faster movement actuating areas, said opening curve transition area being positioned to reduce the shock of engagement of said auxiliary and main valves during valve opening and said closing curve transition area being positioned to reduce the shock of main valve seating during valve closing.

7. The combination of claim 2 wherein said igniting means comprises a spark plug mounted in said cylinder defining means adjacent said ignition chamber, said valve carried wall means including an opening communicating said ignition chamber with said spark plug.

8. The combination of claim 7 wherein said spark plug includes electrodes extending through said wall means opening into said ignition chamber in the closed position of said main inlet valve.

* * * * *